US012715883B2

(12) United States Patent
Leese

(10) Patent No.: US 12,715,883 B2
(45) Date of Patent: Aug. 25, 2026

(54) ORGANOMETALLIC COMPOUNDS

(71) Applicant: UMICORE AG & CO. KG, Hanau-Wolfgang (DE)

(72) Inventor: Albert Barry Leese, Stoke (GB)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 504 days.

(21) Appl. No.: 18/256,378

(22) PCT Filed: Nov. 29, 2021

(86) PCT No.: PCT/EP2021/083275
§ 371 (c)(1),
(2) Date: Jun. 7, 2023

(87) PCT Pub. No.: WO2022/122431
PCT Pub. Date: Jun. 16, 2022

(65) Prior Publication Data

US 2024/0018170 A1 Jan. 18, 2024

(30) Foreign Application Priority Data

Dec. 11, 2020 (EP) .................................... 20213471

(51) Int. Cl.
*C07F 5/06* (2006.01)

(52) U.S. Cl.
CPC .................................. *C07F 5/062* (2013.01)

(58) Field of Classification Search
CPC ...................................................... C07F 5/062
See application file for complete search history.

(56) References Cited

FOREIGN PATENT DOCUMENTS

PL 192855 B1 * 12/2006

OTHER PUBLICATIONS

Oxford Dictionary of English 3rd, 2015 for simultaneously (Year: 2015).*
Sigma for (CH3)3Ga (Year: 2025).*
S. Yamashita, et al, 158(2), Journal of the Electrochemical Society, H93-H96(2011) (Year: 2011).*
S-C. Tan, et al. 41.48 International Journal of Hydrogen Energy 22663-22667 (2016)("Tan") (Year: 2016).*
Extended European Search Report mailed Apr. 26, 2021 for European Patent Application No. 20213471.4 (6 pages).
Communication pursuant to Article 94(3) EPC mailed Oct. 16, 2024 for European Patent Application No. 21 816 072.9 (5 pages).
Communication pursuant to Article 94(3) EPC mailed Oct. 30, 2025 for European Patent Application No. 21 816 072.9 (5 pages).
Cerny, Z et al. Al NMR study of the trimethylaluminum monomer-dimer equilibrium. Journal of Organomerallic Chemistry. 1990. pp. 157-165.
Airgas. Argon (AR). Argon Pure Gases Guide. 2020. 2 pages.
International Search Report dated Feb. 1, 2022 for International Patent Application No. PCT/EP2021/083275 (3 pages).
Written Opinion of the International Searching Authority dated Feb. 1, 2022 for International Patent Application No. PCT/EP2021/083275 (6 pages).
Buckton, G.B., et al., Vorläufige Mitteilung über einige Aluminium-Verbindungen. Ann. Chem. Suppl., 1865. vol. 4. pp. 109-113 (5 pages in German with machine translation).
Nesmeyanov A.N. et al. The Organic Compounds of Boron, Aluminum, Gallium, Indium and Thallium. Agnew. Chem. 1968. vol. 80, No. 3, p. 130. (1 page in German with machine translation).
Mole, T. et al. Organoaluminium Compounds. Elsevier, New York, 1972. Polymer Letters Edition. p. 656.
Wilkinson, G., et al. (Eds). Comprehensive Organometallic Chemistry: The synthesis, Reactions and Structures of Organometallic Compounds. Pergamon Press, Oxford. 1983. Agnew Chem. vol. 95, No. 10. p. 819 (1 page in German with machine translation).
Nouryon. TMA1 LO Trimethylaluminum, Product Data Sheet. Oct. 12. 2020, pp. 1-3. Retrieved from the Internet on Apr. 16, 2021 https://www.nouryon.com/globalassets/inriver/resources/pds-tmal-lo-electronics-glo-en.pdf (4 pages).

* cited by examiner

*Primary Examiner* — Alexander R Pagano
*Assistant Examiner* — Frank S. Hou
(74) *Attorney, Agent, or Firm* — Smith, Gambrell & Russell, LLP

(57) ABSTRACT

A novel method of making trialkylaluminum compounds and trialkylaluminum obtained thereby via exposing a solution of aluminum to an alkylating agent.

12 Claims, No Drawings

ORGANOMETALLIC COMPOUNDS

Trialkylaluminum compounds are useful in catalysis, organic and inorganic synthesis and in applications for chemical vapor deposition and atomic layer deposition, namely for the manufacture of semiconductor materials, e.g. for electronics applications. Such trialkylaluminum compounds can be obtained in several ways.

G. B. Buckton, W. Odling, Ann. Chem. Suppl., 4 (1865) 109 shows the preparation of trialkylaluminum compounds by reaction of appropriate alkylmercury compounds with excess of aluminum metal (transmetalation) at a temperature of 80-120° C. This synthesis probably is the oldest method for the preparation of trialkylaluminum compounds.

Niesmeyanov and Sokolik, The Organic Compounds of Boron, Aluminum, Gallium, Indium and Thallium, North-Holland, Amsterdam 1967, shows that in this way only lower trialkylaluminum compounds are obtainable with sufficient yield because higher alkylmercury derivatives are not stable enough under the reaction conditions. Both methods, however, require the use of very toxic alkylmercury compounds.

T. Mole, E. A. Jeffrey, Organoaluminium Compounds, Elsevier, New York, 1972 shows that ethyl- and isobutyl-aluminum compounds are industrially obtainable from aluminum, hydrogen and the corresponding alkene in the presence of the corresponding trialkylaluminum in a two-step reaction. In the first step, dialkylhydroaluminum is generated at pressures of about 200 atmospheres and temperatures of about 120° C. The second step is carried out under milder conditions. Pressures of merely about 20 atmospheres and temperatures of up to 60° C. are needed to couple the alkene to the Al—H bond to obtain trialkylaluminum. This method, however, is not very well suited for lower alkylaluminum compounds, and the smallest trialkylaluminum (trimethylaluminum) cannot be prepared via this way because the necessary alkene does not exist.

Comprehensive Organometallic Chemistry, Eds. G. Wilkinson, FGA Stone and E W Abel, Pergamon Press, Oxford J J Eisch, Aluminum Organic Compounds, Vol. 1, (1982), p. 555, teaches that reaction of metallic aluminum with alkyl, alkenyl and aryl chlorides, bromides and iodides result in the formation of corresponding organoaluminum compounds such as trialkylaluminum. In a first step alkyl aluminum sesquihalide (an equimolar mixture of $R_2AlX$ and $R_2AlX$, where R is an alkyl group and X is a halide group) is formed. The second step is a distillative separation of $R_2AlX$ from $RAlX_2$ that is complexed with NaCl and the third reduction of this compound with the appropriate amount of sodium and potassium alloy results in the formation of trialkylaluminum. Yields are poor and less than 33% with respect to aluminum, because large amounts of aluminum are wasted according to the reaction equation:

$$6Al+9MeCl \rightarrow 3Me_3Al_2Cl_3 \quad 1)$$

$$3Me_3Al_2Cl_3+3NaCl \rightarrow 3Me_2AlCl\uparrow+3Na[MeAlCl_3] \quad 2)$$

$$3Me_2AlCl+3Na/K \rightarrow 2Me_3\,Al+Al+3Na/KCl \quad 3)$$

PL 192855 teaches a batch process for the preparation of trimethylaluminum by a transmetalation reaction of aluminum metal powder with trimethylgallium. This method uses rather high temperatures, which negatively impacts the reaction product due to their temperature sensitivity.

In all these methods various shortcomings can be observed, such as toxic educts, insufficient yields and high oxygen content of several ppm oxygen in the end product. This problem is solved with the method of the present patent application.

The Invention relates to a method of making trialkylaluminum by reaction of trialkylgallium with metallic aluminum in the presence of metallic gallium, wherein the aluminum is at least partially dissolved in gallium, resulting in an aluminum/gallium alloy that comprises solid aluminum and remains liquid throughout the reaction which is carried out at a temperature of from to 100° C.

Short Description of the Invention

1. A method of making trialkylaluminum by reaction of trialkylgallium with metallic aluminum in the presence of metallic gallium, wherein the aluminum is at partially dissolved in gallium, resulting in an aluminum/gallium alloy that comprises solid aluminum and remains liquid throughout the reaction and the reaction takes place at a temperature of from 25° C. to 100° C.
2. The method of item 1, wherein the alkyl is methyl or ethyl.
3. The method of items 1 or 2, the aluminum/gallium alloy comprising a saturated solution of aluminum in gallium.
4. The method of any of items 1 to 3, wherein the pressure during the reaction is from 500 hPa to 1500 hPa, 700 hPa to 1300 hPa or 1000 hPa to 1050 hPa.
5. The method of any of items 1 to 4, wherein the temperature during the reaction is from 30 to 95° C. or from 40 to 90° C. or from 50 to 85° C., in particular from 65 to 85° C.
6. The method of any of items 1 to 5, wherein the trialkylgallium is in gaseous form.
7. The method of any of items 1 to 6, wherein the trialkylgallium is added to the reaction mixture continuously.
8. The method of any of items 1 to 7, wherein the trialkylgallium is added in mixture with at least one inert gas, in particular nitrogen or argon.
9. The method of any of items 1 to 8, wherein the trialkylaluminum is isolated by distillation.
10. The method of any of items 1 to 9, wherein the trialkylgallium exhibits an oxygen content of less than 1 ppm.
11. The method of any of items 1 to 10, wherein the trialkylaluminum exhibits an oxygen content of less than 1 ppm.
12. The method of any of items 1 to 11 comprising the steps of
    Providing a saturated solution of aluminum in gallium;
    Adding solid aluminum so as to form a reaction mixture;
    Continuously passing a gas flow comprising trialkylgallium through said reaction mixture at temperatures of from 25 to 100° C. and a pressure of 500 to 1500 hPa, and
    simultaneously distilling off the generated trialkylaluminum.
13. Trialkylaluminum exhibiting an oxygen content of less than 1 ppm.
14. The trialkylaluminum of item 13, being trimethylaluminum or triethylaluminum.
15. Trialkylaluminum of item 13 and 14 exhibiting a gallium content of less than 50 ppm and/or a silicon content of less than 50 ppm, or exhibiting a gallium content of less than 30 ppm and/or a silicon content of less than 30 ppm or exhibiting a gallium content of less than 10 ppm and/or a silicon content of less than 10 ppm or exhibiting a gallium content of less than 1000 ppb and/or a silicon content of less than 1000 ppb.

DETAILED DESCRIPTION OF THE INVENTION

Alkyl can in principle be any kind of alkyl or cycloalkyl, in particular alkyl with one to 8, in particular 1 to 6 or one to five carbon atoms. Usually, very good results can be obtained with alkyl of 1 to 4 carbon atoms, or 1 to 3 carbon atoms such as ethyl, methyl, n-propyl, isopropyl, n-butyl, isobutyl, tert.-butyl, n-pentyl, in particular ethyl, methyl, n-propyl, isopropyl, more specifically methyl or ethyl.

In a specific embodiment, the aluminum/gallium alloy comprises 5 to 10 weight percent aluminum and 90 to 95 weight percent gallium, more specifically about 10 weight percent of aluminum and about 90 weight percent of gallium. More specifically, the aluminum/gallium alloy comprises a saturated solution of aluminum in gallium. Yet more specifically, the aluminum/gallium alloy is a saturated solution of aluminum in gallium. A saturated solution will make a larger amount of aluminum available to the reaction with trialkylgallium than a lower aluminum concentration.

The presence of metallic aluminum, which practically can be present in a distributed form like particles, such as granules or a powder, on one hand ensures the aluminum/gallium alloy will continue to contain a high amount of aluminum, in particular continue to be a saturated solution of aluminum in gallium throughout the reaction. On the other hand, gallium does activate the surface of the aluminum particles allowing the surface of the aluminum particles to take part in the reaction.

In general, the reaction may take place at temperatures that ensure that the aluminum/gallium alloy is liquid, for example at temperatures of about 25° C. to about 100° C., more specifically 30 to 95° C. or from 40 to 90° C. or from 40 to 90° C., in particular from 65 to 85° C.

The pressure during the reaction, in general, may be from 500 hPa to 1500 hPa, such as 700 hPa to 1300 hPa or 1000 hPa to 1050 hPa.

In another specific embodiment, trialkylgallium is added continuously. More specifically, trialkylgallium is added in gaseous form. In particular, the trialkylgallium is added in gaseous form and in a mixture with one or more inert gases, more specifically nitrogen, argon or combinations thereof. The gas comprising trialkylgallium may be passed through the liquid aluminum/gallium alloy or may be provided to the surface of the aluminum/gallium alloy or both, for example.

More specifically, the trialkylgallium can be trimethylgallium or triethylgallium, resulting in the trialkylaluminum being trimethylaluminum or triethylaluminum.

The trialkylgallium employed may have a low oxygen content, in particular an oxygen content of less than 5 ppm, in particular less than 1 ppm. The trialkylaluminum will thus have an oxygen content of less than 1 ppm.

The trialkylaluminum, in particular trimethylaluminum or triethylaluminum so generated may be isolated by distillation. In general, the reaction takes place in a reactor containing the aluminum/gallium alloy, preferably also comprising metallic aluminum at roughly the desired reaction temperature, such as about 65° C. to 85° C. under essentially oxygen- and water-free conditions. Such oxygen- and water-free conditions keep oxygen and water levels to less than 5 ppm, in particular to a level of less than 3 ppm and more particularly to less than 1 ppm. Trialkylgallium, such as trimethylgallium or triethylgallium, is provided and may be passed through the liquid aluminum/gallium alloy in the form of a gaseous mixture with an inert gas, such as nitrogen, containing less than 5 ppm, in particular less than 3 ppm and more particularly less than 1 ppm of oxygen and water.

The trialkylaluminum so created can evaporate and, together with the inert gas, leave the reactor and pass through a cold trap in which the trialkylaluminum will condensate and is collected during the reaction. This is a possible way to isolate trialkylaluminum by distillation. Obviously, additional distillation steps may be carried out in order to further purify the reaction product.

Trialkylaluminum obtained by the method claimed herein usually exhibits a high purity with a low gallium content of less than 50 ppm, in particular less than 30 ppm, more specifically less than 10 ppm or less than 1000 ppb of gallium. It also exhibits a silicon content of less than 50 ppm, in particular ppm, more specifically less than 10 ppm or less than 1000 ppb of silicon. The oxygen content is, in general, less than 1 ppm, advantageously less than 0.5 ppm, in particular less than 0.1 ppm.

The invention thus also relates to trialkylaluminum, in particular trimethylaluminum or triethylaluminum, exhibiting an oxygen content of 1 ppm or less.

The invention thus also relates to trialkylaluminum, in particular trimethylaluminum or triethylaluminum, exhibiting a gallium content of 50 ppm or less or 30 ppm or less.

The invention thus also relates to trialkylaluminum, in particular trimethylaluminum or triethylaluminum, exhibiting a silicon content of 50 ppm or less or 30 ppm or less.

The invention thus also relates to trialkylaluminum, in particular trimethylaluminum or triethylaluminum, exhibiting an oxygen content of 1 ppm or less, a gallium content of 50 ppm or less or 30 ppm or less and/or a silicon content of 50 ppm or less or 30 ppm or less.

In general, the method of the invention is advantageously carried out under inert conditions, i.e. essentially free of water and oxygen and under protective atmosphere of an inert gas, such as nitrogen or argon, for example.

Another embodiment relates to a method of as described above, comprising the steps of Providing a saturated solution of aluminum in gallium;

Adding solid aluminum so as to form a reaction mixture;

Continuously passing a gas flow comprising trialkylgallium through said reaction mixture at temperatures of from 25 to 100° C. and a pressure of 500 to 1500 hPa, and simultaneously distilling off the generated trialkylaluminum.

Example

Preparing the starting alloy:

700 g of gallium were molten at 60° C. After the gallium was completely molten, 7 g of aluminum granules were added and the mixture was stirred at room temperature. After complete dissolution of the aluminum granules, 3 g of aluminum granules are added in small portions and allowed to dissolve under stirring. After the complete dissolution, a phase separation was conducted: The lower phase was isolated by decantation. This shiny melt was used for the reactions with trialkylgallium and can be stored at 100° C. until required.

Production Plant:

The production plant consists of a source bubbler, one reaction bubbler and one collection bubbler. The source bubbler was connected to the reaction bubbler in such a way that an inert gas stream could get through the dip tube into the bubbler and the contained liquid. Through the gas outlet of the source bubbler the gas flow was directed into the reaction bubbler via its dip tube, so that the gas flow saturated with trimethyl gallium was bubbled through the liquid alloy. The gas stream was led through the gas outlet into the dip tube of the collection bubbler, where the product condensates and the inert gas leaves the system through the gas outlet.

Every single bubbler was attached to a vacuum/inert gas manifold in order to allow oxygen and moisture free maintenance.

The source bubbler contains the alkylating reagent, in this case trimethyl gallium, which was cooled to −3° C. during the process.

The reaction bubbler contains an aluminum/gallium alloy, which was heated to 75±10° C. in order to keep the alloy liquid and responsive for the reaction. The collection bubbler was cooled to 10° C. and was used as the receiving container, where the reaction product, in this case trimethyl aluminum, was gathered.

The inert gas flow rate was set to 2000 (±10) sccm. sccm is a standardized unit for a mass flow and is defined according to the German DIN 1343.

The used inert gas is purified via standard methods (e. g. oxygen getter) and the oxygen content is monitored via standard oxygen sensors (e.g. potentiometric zirconia oxygen gas sensor).

First Run:

A bubbler containing 950 g of trimethyl gallium (8.28 mol) was attached to the plant. A reaction bubbler was filled with 11 kg of the starting alloy and 725 g of aluminum pellets under inert conditions. Afterwards, the system was purged with nitrogen in order to deoxygenate the bubbler. A slow gas stream consisting of high purity nitrogen was passed through the trimethyl gallium bubbler and this nitrogen stream (saturated with trimethylgallium) was passed through the liquid gallium aluminum alloy in the reaction bubbler. Trimethyl aluminum was carried with the nitrogen gas stream into a collection bubbler. 500 g of trimethylaluminum (6.93 mol respective to aluminum, 84%) were isolated from the collection bubbler. The empty source bubbler was disassembled under usage of the vacuum/inert gas manifold and replaced with a fresh source bubbler containing 950 g of trimethyl gallium. A slow gas stream consisting of high purity nitrogen was passed through the trimethyl gallium bubbler and this nitrogen stream (saturated with trimethylgallium) was passed through the liquid gallium aluminum alloy. Trimethyl aluminum was carried with the nitrogen gas stream into a collection bubbler. 500 g of trimethylaluminum (6.93 mol respective to aluminum, 84%) were isolated from the collection bubbler.

After every second run (i. e., after every second emptied source bubbler), the reaction bubbler was opened under usage of the vacuum/inert gas manifold. 500 g of aluminum pellets are added to the alloy and the top of the alloy was skimmed, removing 1 kg of alloy from the reaction bubbler.

Afterwards the reaction bubbler was closed again. After inertisation of the system the procedure can proceed starting from the point "first run" above.

The resulting trimethylaluminum was analyzed for oxygen and exhibited an oxygen content of less than 1 ppm.

The identity of the trimethylaluminium was confirmed via its proton NMR spectrum and ICP.

Trace metal impurities were determined via ICP-MS and were in total below 1000 ppb.

Oxygen content was determined via proton NMR spectroscopy by comparing the signals that can be attributed to the pure product and to the oxygen containing impurity. From the signal intensities the molar ratio can be calculated under usage of the molar mass of the impurity and the pure product.

The invention claimed is:

1. A method of making trialkylaluminum by reaction of trialkylgallium with metallic aluminum in the presence of metallic gallium, comprising the steps of (a) providing a liquid saturated solution of aluminum in gallium;

(b) adding solid aluminum to the saturated solution so as to form a reaction mixture;

(c) continuously passing a gas flow comprising trialkylgallium under an inert carrier gas through said reaction mixture at temperatures of from 25 to 100° C. and a pressure of 500 to 1500 hPa;

(d) simultaneously distilling off the trialkylaluminum generated during step (c), wherein the trialkylgallium is added to the reaction mixture continuously.

2. The method of claim 1, wherein the alkyl is methyl or ethyl.

3. The method of claim 1, wherein the pressure during the reaction is from 700 hPa to 1300 hPa.

4. The method of claim 1, wherein the temperature during the reaction is from 30 to 95° C.

5. The method of claim 1, wherein the trialkylgallium is in gaseous form.

6. The method of claim 1, wherein the trialkylgallium is added in mixture with at least one inert gas selected from nitrogen or argon.

7. The method of claim 1, wherein the trialkylgallium exhibits an oxygen content of less than 1 ppm.

8. The method of claim 1, wherein the trialkylaluminum exhibits an oxygen content of less than 1 ppm.

9. A method of making trialkylaluminum by reaction of trialkylgallium with metallic aluminum in the presence of metallic gallium, comprising the steps of (a) providing a liquid saturated solution of aluminum in gallium;

(b) adding solid aluminum to the saturated solution so as to form a reaction mixture;

(c) continuously passing a gas flow comprising trialkylgallium under an inert carrier gas through said reaction mixture at temperatures of from 25 to 100° C. and a pressure of 500 to 1500 hPa;

(d) simultaneously distilling of the trialkylaluminum generated during step (c); and (e) recovering the trialkylaluminum isolated by distillation wherein the trialkylgallium is added to the reaction mixture continuously.

10. The method of claim 1, wherein the pressure during the reaction is from 1000 hPa to 1050 hPa.

11. The method of claim 1, wherein the temperature during the reaction is from 40 to 90° C.

12. The method of claim 1, wherein the temperature during the reaction is from 65 to 85° C.

* * * * *